United States Patent
Pandolfi et al.

(10) Patent No.: US 9,820,129 B2
(45) Date of Patent: Nov. 14, 2017

(54) CHARGING MECHANISM FOR COMMUNICATION NETWORK

(75) Inventors: Alessandra Pandolfi, Munich (DE); Maximilian Riegel, Nuremberg (DE)

(73) Assignee: Nokia Solutions and Networks Oy, Espoo (FI)

( * ) Notice: Subject to any disclaimer, the term of this patent is extended or adjusted under 35 U.S.C. 154(b) by 363 days.

(21) Appl. No.: 14/367,283

(22) PCT Filed: Dec. 21, 2011

(86) PCT No.: PCT/EP2011/073579
§ 371 (c)(1),
(2), (4) Date: May 1, 2015

(87) PCT Pub. No.: WO2013/091687
PCT Pub. Date: Jun. 27, 2013

(65) Prior Publication Data
US 2016/0066172 A1    Mar. 3, 2016

(51) Int. Cl.
*H04W 4/26* (2009.01)
*H04W 28/22* (2009.01)
(Continued)

(52) U.S. Cl.
CPC .......... *H04W 4/26* (2013.01); *H04L 12/1492* (2013.01); *H04M 15/8033* (2013.01);
(Continued)

(58) Field of Classification Search
CPC ....... H04W 4/26; H04W 28/22; H04W 84/12; H04M 15/8033; H04M 15/8038; H04M 15/93; H04M 15/81; H04L 12/1492
(Continued)

(56) References Cited

U.S. PATENT DOCUMENTS 8,611,852 B2 * 12/2013 Guionnet ............ H04L 12/1485
455/405
2005/0181758 A1 * 8/2005 Ansamaa ............ H04L 12/2854
455/406
(Continued)

FOREIGN PATENT DOCUMENTS

WO    WO2007101409 A1    9/2007
WO    WO2007113383 A1    10/2007
WO    WO2009145785 A1    12/2009

OTHER PUBLICATIONS

P. Calhoun et al.; "Diameter Network Access Server Application"; Aug. 2005; IETF RFC 4005; 85 pgs.
(Continued)

*Primary Examiner* — Brandon Miller
(74) *Attorney, Agent, or Firm* — Harrington & Smith

(57) ABSTRACT

There is provided a charging control mechanism allowing flexible charging in specified communication areas of a communication network, for example of a WLAN. When it is detected that a UE tries to access in a specified communication network area, a charging setting to be used for a communication in the specified communication network area is determined and a rating information in the form of a rating attribute is included in each CDR for indicating the charging setting to be used for charging a communication of the UE in the specified communication network area. A rating/charging engine uses the rating attribute for determining the charging amount for the communication.

18 Claims, 6 Drawing Sheets

(51) Int. Cl.
 H04M 15/00 (2006.01)
 H04L 12/14 (2006.01)
 H04W 84/12 (2009.01)
(52) U.S. Cl.
 CPC ....... H04M 15/8038 (2013.01); H04M 15/81 (2013.01); H04M 15/93 (2013.01); H04W 28/22 (2013.01); *H04W 84/12* (2013.01)
(58) Field of Classification Search
 USPC ........................................................ 455/405
 See application file for complete search history.

(56) References Cited

U.S. PATENT DOCUMENTS

| | | | |
|---|---|---|---|
| 2005/0197867 A1* | 9/2005 | Edgett ................... | G06Q 10/02 705/5 |
| 2007/0036120 A1* | 2/2007 | Zhang .................... | H04L 12/14 370/338 |
| 2007/0104186 A1* | 5/2007 | Kramer ................... | H04L 63/10 370/352 |
| 2007/0136195 A1* | 6/2007 | Banjo ................ | G06Q 20/1085 705/43 |
| 2007/0242695 A1* | 10/2007 | Xu ........................ | H04W 48/08 370/468 |
| 2008/0109331 A1 | 5/2008 | Stadelmann et al. .......... | 705/34 |
| 2008/0274715 A1* | 11/2008 | Heit ...................... | H04M 15/00 455/406 |

OTHER PUBLICATIONS

C. Rigney et al.; "RADIUS Accounting"; Jun. 2000; IETF RFC 2866; 28 pgs.

3GPP TS 23.234 V9.0.0 (Dec. 2009); "3rd Generation Partnership Project; Technical Specification Group Services and System Aspects; 3GPP system to Wireless Local Area Network (WLAN) interworking; System description (Release 9)"; 84 pgs.

* cited by examiner

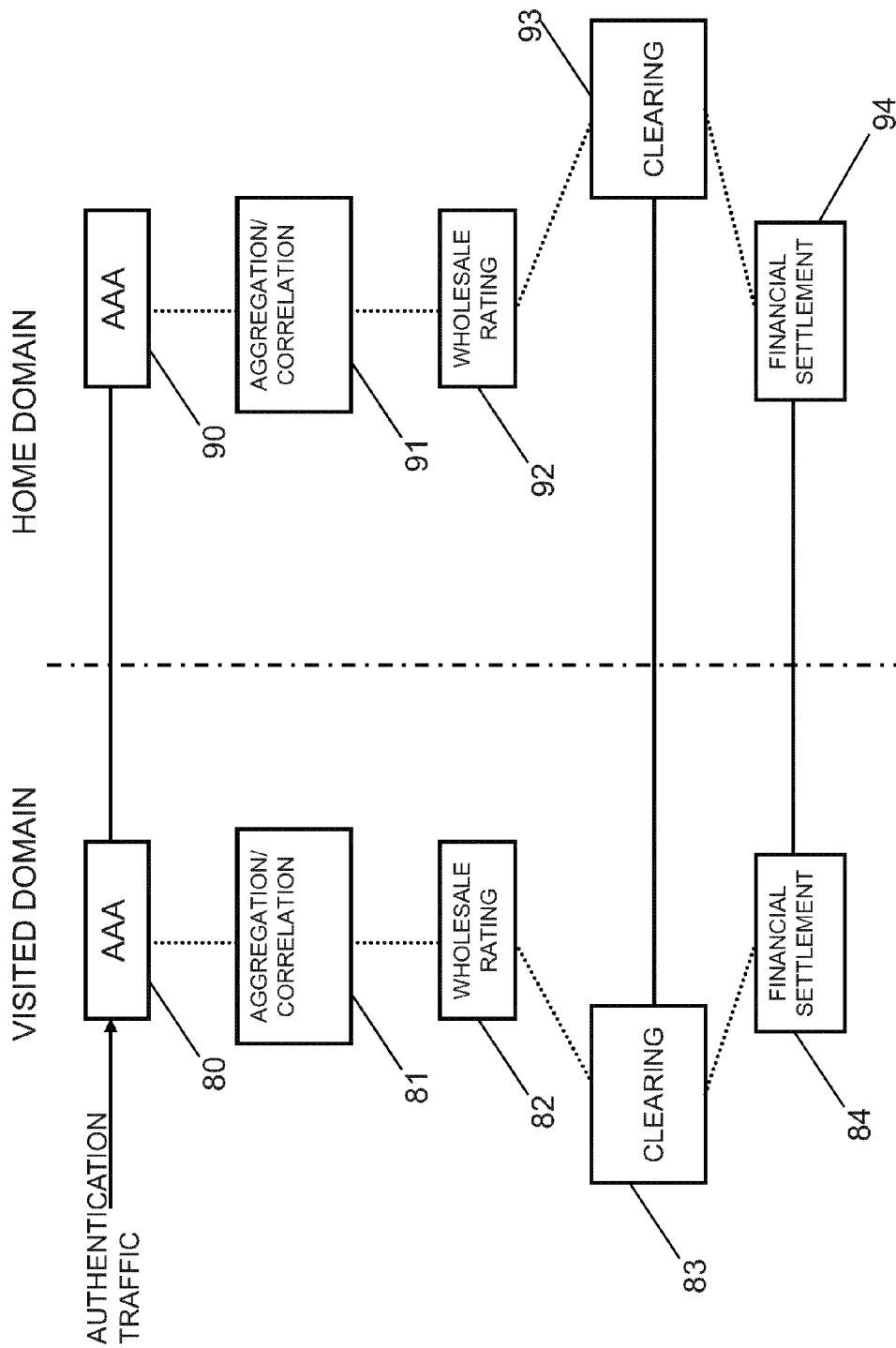

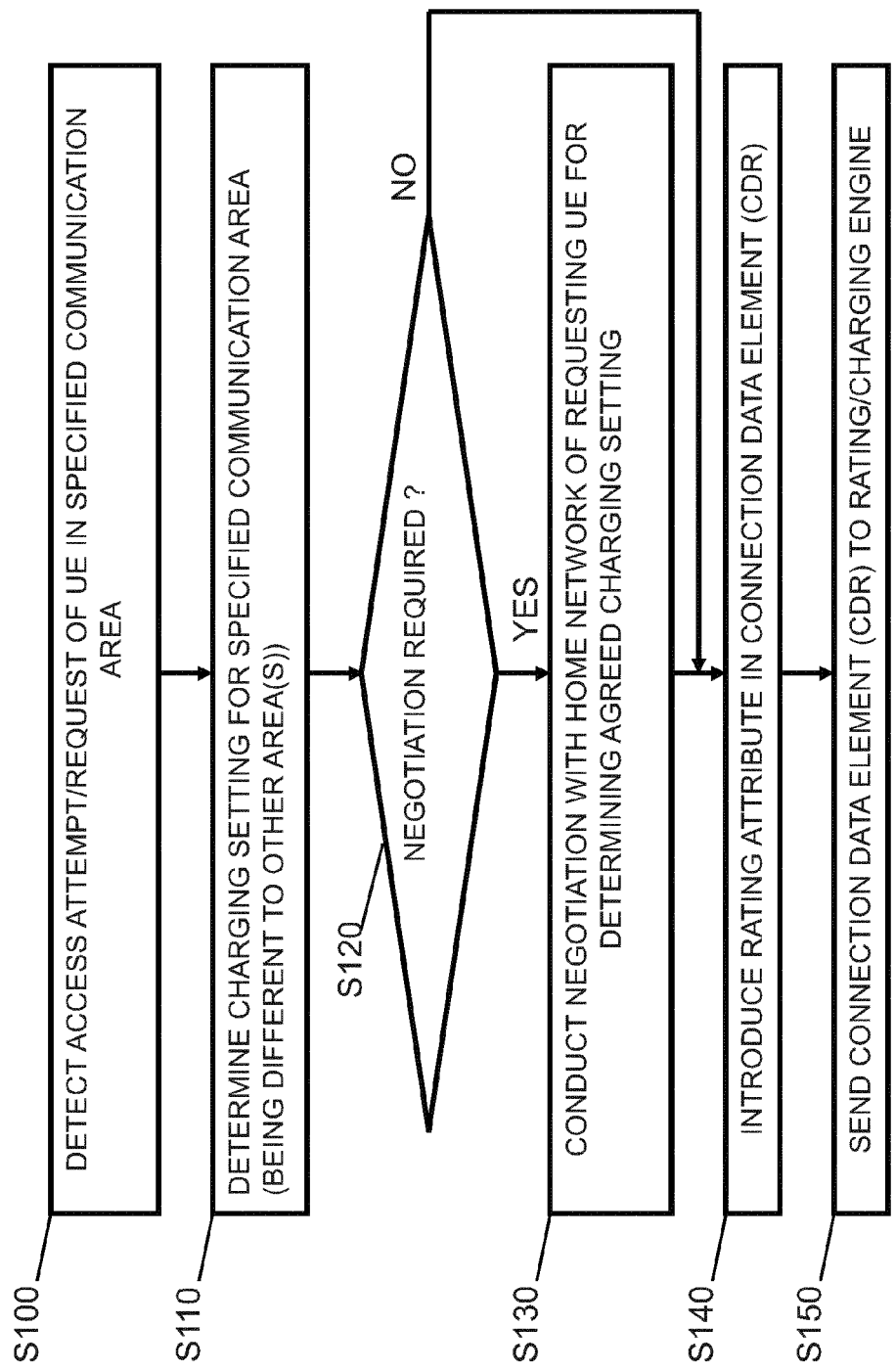

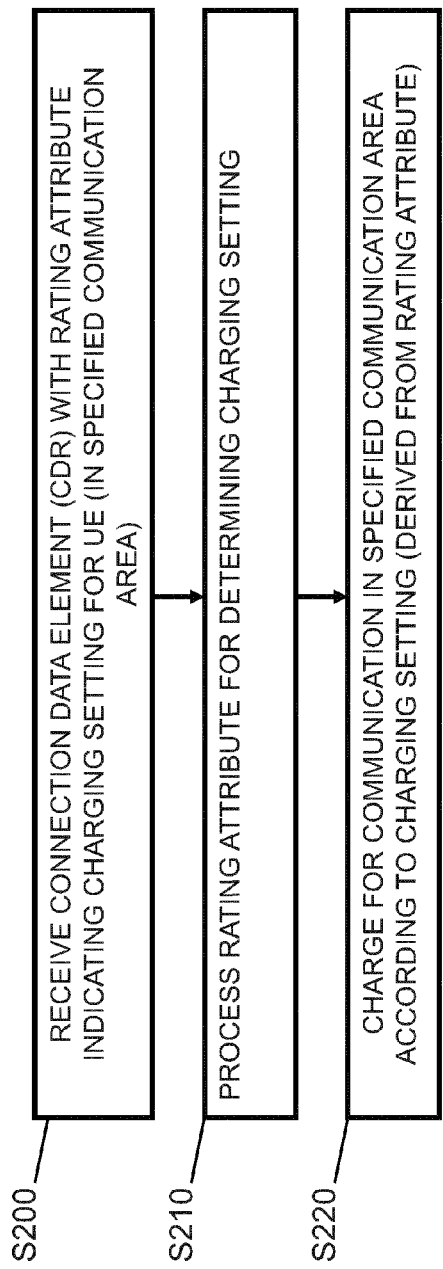
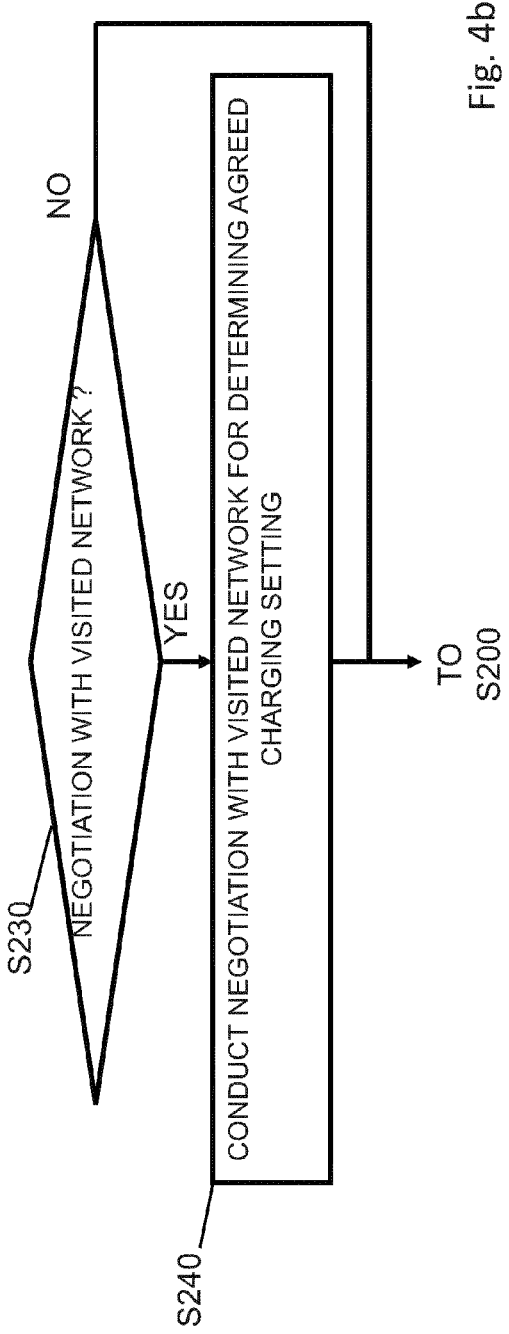
Fig. 4a
Fig. 4b

CHARGING MECHANISM FOR COMMUNICATION NETWORK

BACKGROUND OF THE INVENTION

Field of the Invention

The present invention relates to a mechanism for controlling charging in a communication network. Specifically, the present invention is related to an apparatus, a method and a computer program product which provide a mechanism allowable flexible charging in specified communication areas of a communication network, for example of a WLAN.

Related Background Art

Prior art which is related to this technical field can e.g. be found in technical specifications related to WLAN, such as 3GPP TS 23.234 (see e.g. version 9.0.0), as well as in documents related to access authentication, authorization and accounting procedures and protocols, such as IETF RFC 2866 (RADIUS accounting) and IETF RFC 4005 (DIAMETER NAS application).

The following meanings for the abbreviations used in this specification apply:
AAA authentication, authorization and accounting
AVP attribute value pair
CDR call data records
HLR home location register
HSS home subscription server
NAS network access server
OCS online charging system
PDG packed data gateway
RADIUS remote authentication dial in user service
SLF subscription locator function
TLV type length value
WAG WLAN access gateway
WLAN wireless local area network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

With the wider deployment of automatic login procedures for Wi-Fi in public hotspots, roaming will be more widely deployed between hotspot operators and in particular mobile operators, which like to offload cellular traffic to WLAN or the like to prevent congestion in cellular networks, e.g. in dense areas.

Roaming describes an architecture for allowing customers of one operator to get access to the network of another operator. While the access authentication, authorization and accounting are based on the well known methods using, for example, RADIUS or DIAMETER protocol for carrying information between the home operator (i.e. the operator to which a customer or user has a subscription) and the visited operator (i.e. the operator of the network to which the customer likes to connect), roaming adds several additional functions. These function, to which for example rating, clearing, negotiating processes, financial settlement and the like may belong, may be performed by a third party entity which is also called roaming provider.

However, usually, a third party roaming provider causes extra costs which add to the value chain of the extremely cost sensitive WLAN roaming. Hence, the usage of such third party roaming providers is not optimal from the financial point of view.

On the other hand, conventionally, when omitting such third party roaming providers for rating, clearing and financial settlement, only simple financial models are applicable.

For example, in case it is intended to charge services in special areas (also referred to as specified communication areas) differently, e.g. by operators of a WLAN which is positioned in particular locations (e.g. expensive locations as luxury hotels, conference centers, etc.), that is in case these operators wish to charge users differently in comparison to e.g. public locations (e.g. train stations, parks, etc.), for example since a better network performance or a higher security level is provided, such additional charges are usually accounted by demanding a given fee from the users to allow access to their network.

SUMMARY OF THE INVENTION

It is an object of the invention to provide an improved mechanism for controlling charging in a communication network. Specifically, it is an object of the invention to provide an apparatus, a method and a computer program product by means of which flexible charging of users being located in specified communication areas of a communication network, for example of a WLAN is possible.

These objects are achieved by the measures defined in the attached claims.

According to an example of an embodiment of the proposed solution, there is provided, for example, an apparatus comprising a detector configured to detect an access attempt of a communication network element in a specified communication network area, a determiner configured to determine a charging setting to be used for a communication in the specified communication network area, and a rating information processing portion configured to introduce a rating attribute information element in a connection data element for indicating the charging setting to be used for charging a communication of the communication network element in the specified communication network area.

Furthermore, according to an example of an embodiment of the proposed solution, there is provided, for example, a method comprising detecting an access attempt of a communication network element in a specified communication network area, determining a charging setting to be used for a communication in the specified communication network area, and generating and introducing a rating attribute information element in a connection data element for indicating the charging setting to be used for charging a communication of the communication network element in the specified communication network area.

According to further refinements, these examples may comprise one or more of the following features:

the charging setting to be used for a communication in the specified communication network area may reflect a difference in charging in comparison to at least one of a communication network area having another location, to a communication conducted at another time or under different communication conditions;

a value indicating a multiplier for a default charging amount may be introduced as the rating attribute information element, wherein the value may be derived from the charging setting;

alternatively, an index value indicating a predefined rating model may be introduced as the rating attribute information element, wherein the index may be derived from the charging setting;

the rating attribute information element may be introduced in a call data record as the connection data element and a transmission of the call data record to a rating and charging function element in a service layer may be initialized;

for a charging rule negotiating processing, a request for accepting a proposed charging setting to be used for a communication of a specific communication network element in the specified communication network area may be transmitted, wherein in case an acceptance for the request for accepting the proposed charging setting is received, the proposed charging setting may be set as the charging setting to be used, while in case an alternative proposal for charging setting being different to the proposed charging setting is received, the alternative proposal for charging setting may be set as the charging setting to be used, or a modified request indicating a different proposed charging setting may be transmitted, or in case a non-acceptance for the request for accepting the proposed charging setting is received, a modified request indicating a different proposed charging setting may be transmitted;

in the charging rule negotiating processing, the request for accepting the proposed charging setting may be transmitted in an initial access request message for an authentication, authorization and accounting session;

accounting records from different locations may be collected by an aggregator function, and a modification processing for modifying at least one of the charging setting and the rating attribute information element may be executed on the basis of the collected accounting records;

the functions may be conducted in at least one of an authentication-authorization-accounting server element, an authentication-authorization-accounting proxy element, and an accounting aggregation server element of a communication network;

the functions may be conducted in a communication network control element of a communication network being a visited network of the access attempting communication network element, wherein the rating attribute information element may be introduced in a connection data element transmitted to a home network of the communication network element.

According to an example of an embodiment of the proposed solution, there is provided, for example, an apparatus comprising a connection data element processing portion configured to receive and process a connection data element comprising a rating attribute information element for indicating a charging setting to be used for charging a communication of a communication network element in a specified communication network area, and a rating and charging processing portion configured to charge for the communication of the communication network element in the specified communication network area an amount based on the charging setting received in the connection data element.

Furthermore, according to an example of an embodiment of the proposed solution, there is provided, for example, a method comprising receiving and processing a connection data element comprising a rating attribute information element for indicating a charging setting to be used for charging a communication of a communication network element in a specified communication network area, and conducting charging for the communication of the communication network element in the specified communication network area an amount based on the charging setting received in the connection data element.

According to further refinements, these examples may comprise one or more of the following features:

the charging setting to be used for a communication in the specified communication network area may reflect a difference in charging in comparison to at least one of a communication network area having another location, to a communication conducted at another time or under different communication conditions;

the rating attribute information element may be a value indicating a multiplier, wherein a default charging amount may be multiplied with the multiplier for determining the charging amount;

alternatively, the rating attribute information element may be an index value, wherein a predefined rating model related to the index may be selected and the rating model may be used for determining the charging amount;

a call data record may be received as the connection data element including the rating attribute information element, the call data record being directed to a rating and charging function element in a service layer;

a proposal for a charging setting to be used for a communication of a specific communication network element in the specified communication network area may be received and processed, wherein in case the proposal for a charging setting is accepted, an acceptance for the proposed charging setting may be sent, and in case the proposal for a charging setting is not accepted, an alternative proposal for a charging setting being different to the proposed charging setting may be generated and transmitted;

the proposal for a charging setting may be received in an initial access request message for an authentication, authorization and accounting session;

the functions may be implemented in an authentication-authorization-accounting server element of a communication network.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a mechanism by means of which charging in a communication network such as a WLAN can be made more flexible so that users being in specified areas or locations can be charged differently than other users being in different locations or areas. Furthermore, the proposed solutions allow the flexible charging while keeping the signaling load low, since for example a necessity to communicate to a service layer being responsible for charging information regarding which are the particular locations to be charged in a different way can be avoided, while the information for different charging is present when actually needed, i.e. when a communication connection is to be charged actually. Hence, according to the present invention, it is possible to provide e.g. a common roaming functionality at a lower complexity level and decreased effort while allowing a faster processing.

The above and still further objects, features and advantages of the invention will become more apparent upon referring to the description and the accompanying drawings.

BRIEF DESCRIPTION OF THE DRAWINGS

FIG. 2 shows a diagram illustrating a roaming interface configuration of a communication network as illustrated in FIG. 1.

FIG. 3 shows a flowchart illustrating a charging control processing executed in a communication network control element of a specified communication area according to examples of embodiments of the invention.

FIGS. 4a and 4b show flowcharts illustrating a charging control processing executed in a communication network control element used in a rating/charging engine according to examples of embodiments of the invention.

DESCRIPTION OF PREFERRED EMBODIMENTS

Figure 1:
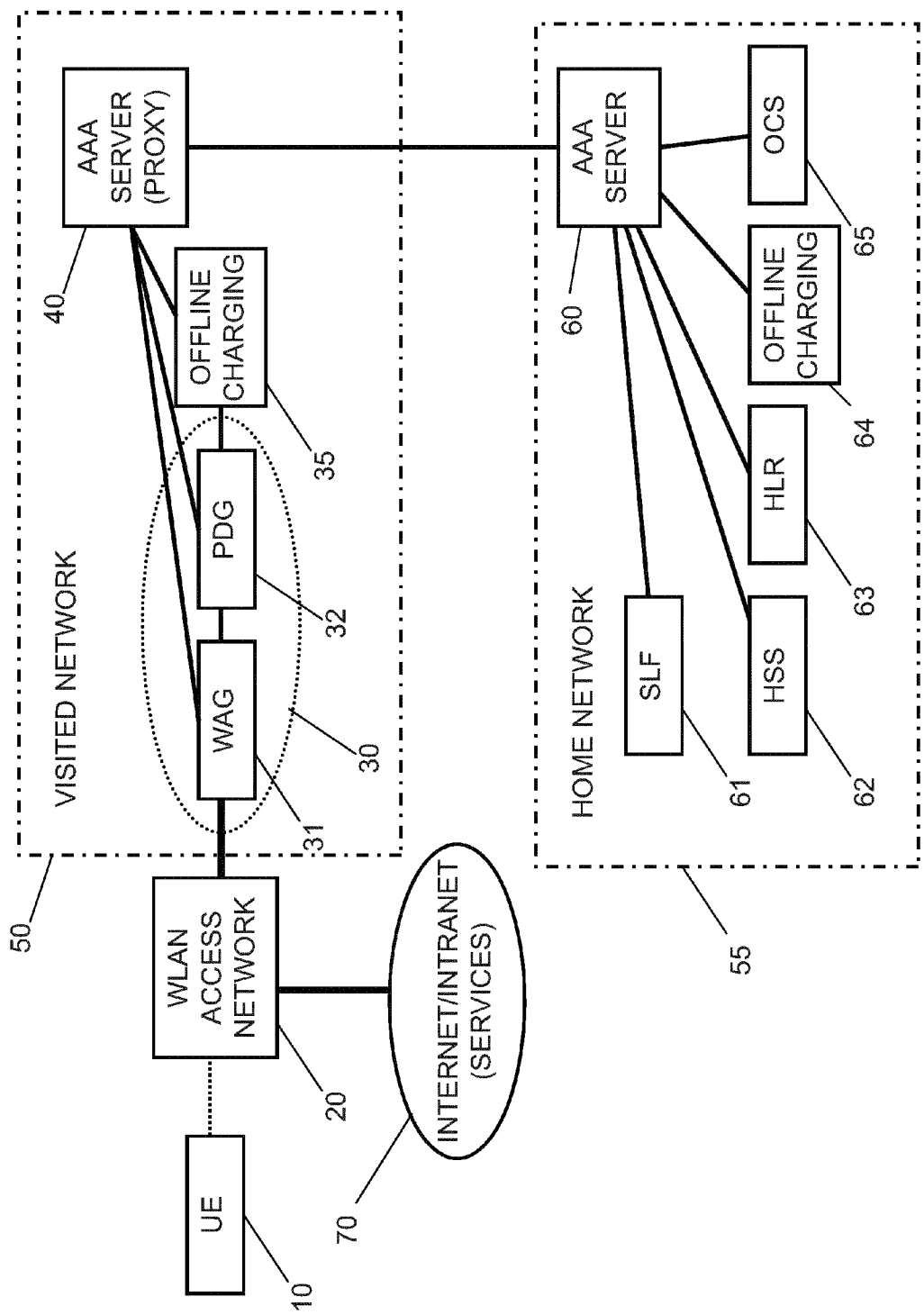
FIG. 1 shows a diagram illustrating a communication network configuration in which examples of embodiments of the invention are implementable.

In the following, examples and embodiments of the present invention are described with reference to the drawings. For illustrating the present invention, the examples and embodiments will be described in connection with wireless communication network based on WiMAX standards. However, it is to be noted that the present invention is not limited to an application using such a type of communication system or network, but is also applicable in other types of communication systems and the like where a fragmentation transmission scheme is applied.

A basic system architecture of a communication network may comprise a commonly known architecture of a communication system comprising a sender or source station and a receiver or destination station. In addition to the source and destination stations, further elements such as wired or wireless access network subsystem and a core network may be part of the communication system architecture. Such an architecture may comprise one or more network elements such as routers, servers, access network control elements, radio access network elements, access service network gateways or base transceiver stations, e.g. base stations, with which a host network element or device, such as a user equipment or another device having a similar function, such as a modem chipset, a chip, a module etc., which can also be part of a user equipment or attached as a separate element to a user equipment, or the like, is capable to communicate via one or more channels for transmitting several types of data.

The general functions and interconnections of the described elements, depending on the actual network type, are known to those skilled in the art and described in corresponding specifications so that a detailed description thereof is omitted herein. However, it is to be noted that several additional network elements and signaling links may be employed for a communication connection between the source and destination stations or network nodes, besides those described in detail herein below.

Furthermore, the described network elements, such as a server or proxy network element, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy discs, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

FIG. 1 shows a diagram illustrating a communication network configuration in which examples of embodiments of the invention are implementable. The network according to FIG. 1 is for example based on 3GPP specifications for WLAN. It is to be noted that the general functions of the elements described in connection with FIG. 1 as well as of reference points/interfaces therebetween are known to those skilled in the art so that a detailed description thereof is omitted here for the sake of simplicity.

In the diagram illustrated in FIG. 1, a communication network element such as a UE 10, which may be able to communicate via a WLAN compatible interface and via cellular access, is trying to gain access to a (visited) network 50 in a specified communication area covered by an access station of a WLAN access network 20. The WLAN access network 20 provides access to Internet/Intranet 70, i.e. to services thereof, and is connected to a WLAN 3GPP IP access system 30 comprising a WAG 31 and a PDG 32. The PDG 32 may provide, amongst others, a function related to the generation of charging information related to user data traffic for offline and online charging purposes. Furthermore, an offline charging system 35 is provided in visited network 50 which is connected to the PDG 32. The WLAN access network 20, the WAG 31, the PDG 32 and the offline charging system 35 are connected to an AAA proxy server 40 for conducting authentication, authorization and accounting processes, for example by means of an AAA protocol such as RADIUS or Diameter. For conducting authentication, authorization and accounting processes with the home network 55 of a visiting subscriber (UE 10), the AAA proxy 40 communicates e.g. by means of a RADIUS based communication with a home network AAA server 60, e.g. via a secure Internet connection 60.

In the home network 55, the AAA server 60 is connected with an SLF 61, a HSS 62, a HLR 63, an offline charging system 64 and an OCS 65, for example, via corresponding reference points/interfaces.

FIG. 2 illustrates a diagram according to a comparative example for explaining a roaming case in a WiMAX based communication network connection.

Specifically, FIG. 2 shows a roaming interface between a visited operator (left side of the chain-dotted line) and a home operator or roaming provider, if a third party is involved due to the complexity of the process as described above (right side of the chain-dotted line).

In an AAA session (authentication traffic), AAA servers 80, 90 provide services involving proxy of e.g. RADIUS messages, correlation and aggregation of session records (function blocks 81, 91), validating roaming agreements between the roaming partners and the transfer of aggregated session records to the a wholesale rating logical function (Blocks 82, 92). The blocks 82, 92 describe functions which represent a process to convert accounting records into (financial) value, by applying policies and rules to the accounting values, e.g. multiply the data volume by the cost per volume unit applicable for the particular location, time and service quality.

Blocks 83, 93 describe clearing functions which represent an agreement process between the home operator and the visited operator about the rating process, i.e. the home operator accepts the application of a particular rating factor for a particular customer.

Blocks 84, 94 describe financial settlement functions which represent a process for a transfer of money values between the home operator and the visited operator.

The complexity in roaming according to the comparative example arises by the necessary processes of wholesale rating 82-92, clearing 83-93 and financial settlement 84-94. Thus, when rating and clearing are seen as quite complex processes in larger roaming arrangements, usually dedicated roaming providers may be involved for taking over the execution of the rating, clearing and financial settlement, but not without adding considerable extra cost to the roaming process and increasing the overall complexity of the signaling and processing.

According to examples of embodiments of the invention, an improved charging control mechanism is provided which allows to avoid such extra costs to the roaming process and to decrease of the overall complexity of the signaling and processing.

According to an example of an embodiment of the invention, an extension of the AAA process is provided to replace the need for a separate rating and clearing process. According to the present examples of embodiments of the invention, AAA signaling is used for transporting charging information since AAA signaling is usually conducted between an operator of a visited communication area, such as a visited hotspot, and an operator of a home network of a communication device such as a mobile node or UE visiting the communication area in question, for example for performing authentication processes for WLAN access etc. Thus, it is possible to provide a common roaming functionality at a much lower complexity and effort, and at a much higher speed.

According to an example of an embodiment of the invention, charging related information is provided by defining a rating attribute or the like for the AAA process of a communication of a UE being in a specified communication area. This rating attribute is then transported in a connection data element, such as a CDR, in order to indicate to a rating/charging engine within a service layer, which is used for charging the user (i.e. the UE), that the charge of the user positioned within the specified communication area, such as a given WLAN spot (e.g. luxury hotels, conference centre), has to be treated in a different way than the charge of users positioned in other locations (e.g. in public WLAN spots).

According to examples of embodiments of the invention, the operator of the accessed network, e.g. the visited WLAN operator, is able to set a value for a rating attribute (i.e. the charging setting indicated by the rating attribute) in a flexible manner. For example, a customizable multiplication factor may be selected so that a final price for the user becomes higher (for example 10 times higher as in a public spot).

According to one example of an embodiment of the invention, the operator of the communication network (e.g. WLAN) including the specified communication area in question (hotspot) indicates in a suitable communication network control element, such as an AAA server, a first accounting aggregation server etc., a charging setting wherein a corresponding (customizable) rating attribute is then added to each connection data element (e.g. CDR). For example, a rating-attribute <10> is added for indicating a charging setting that the final charge has to be multiplied by a (customizable) factor of 10.

A network element used as a rating/charging engine within the service layer detects this factor of 10 and amends the (default) charge accordingly. For example, the default amount is multiplied by the indicated factor of 10 for a communication of the UE in the specified communication area of the (visited) network.

According to a further example of embodiments of the invention, rules for applying rating values, i.e. charging settings for a specified communication area, are agreed between the operators of the visited and the home network (or a roaming operator). That is, when a UE subscribed in a (home) network having an agreement with the visited network about a charging setting (e.g. a rating value such as a multiplier or the like), this charging setting is reflected in the rating attribute sent with the CDR, for example.

According to a further example of embodiments of the invention, when rating values change over time and/or location, or change by the kind of service and performance (higher bandwidth required, for example) consumed by the visiting user in the specified communication area (e.g. the Wi-Fi hotspot), rules for applying rating values are dynamically negotiated between the visited operator and the home operator (or a roaming operator). For example, the visited operator requests a particular rule or rule set in an (initial) message in an authentication process for the UE in question, e.g. in a RADIUS ACCESS_request message, and the home operator is configured to confirm the requested rule or to adjust the proposed rule by replying in a corresponding reply message, e.g. in an authorization accept message such as a RADIUS ACCESS_accept message.

According to a still further example of embodiments of the invention, instead of a charging setting indicating a fixed multiplication factor, a more complex charging model may be used as charging setting, i.e. may be indicated by means of a rating attribute in a connection data set (CDR). For example, a rating model where some amount of data volume is for free (i.e. not charged) and then decreasing costs of volume depending on the amount of volume used during the communication session in the specified communication area may be set. For indicating such a model, the value of the rating amount is used to indicate an index or the like designating a number of plural rating models, which may be agreed between the visited network operator and the home operator (or a roaming operator).

According to a further example of an embodiment of the invention, when for example the rating attribute indicates an index to a list of different charging models (which may be of different complexity), when an access of a UE to the specified communication are is detected, the visited network adds in an initial message, such as an ACCESS_request message, an information element, e.g. by including a corresponding rating attribute, which indicates a proposed rating model. The home operator determines on the basis of the information element (e.g. the rating attribute) which rating model is proposed, during the authentication process in the home AAA operation.

If the proposed model is acceptable, the home network indicates in a reply message the acceptance of the proposed charging setting, so that the visited network can use the rating attribute in CDRs, which corresponds to the proposed model.

Otherwise, in case the proposed model is not accepted by the home network, the home network proposes another rating model, i.e. it replaces e.g. the rating attribute sent by the visited network by another rating attribute indicating the alternative rating model (another index), in the reply message.

The visited network has the possibility to accept or deny the rating value coming back from the home network operator. That is, in case the value in an ACCESS_accept message is appropriate to the visited network operator, the UE is provided with access to the specified communication network and the agreed rating attribute is included in each accounting message (e.g. CDR) belonging to that session. Otherwise, in case the returned rating attribute (the charging setting authorized by the home network operator) is not acceptable to the visited operator, the access is not provided. Then, the visited operator has the possibility to initiate another access request message to the home operator for proposing still another value for the rating model, or to finally terminate the access attempt.

According to a further example of an embodiment of the invention, the value of the rating attribute (the charging setting) is first set, for example, in an AAA server in the access network of the visited network. According to still further examples of embodiments of the invention, the value of the rating attribute (i.e. the charging setting) is modified in another network element or by another function, such as by an AAA proxy of the accounting chain. For example, the final charging may be further increased by increasing the value of the rating attribute, or the like. According to further examples of embodiments, in connection with the modification of the charging setting, elements or functions providing services for collecting and processing information from the network, such as aggregators are provided which collect accounting records from different locations and make a modification applicable by applying a further factor on the final charging value.

According to further examples of embodiments of the invention, a structure of a rating attribute used for indication a charging setting for the specified communication area may have a format corresponding to the used AAA protocol, for example according to a TLV definition according to RADIUS protocol or an AVP definition according to DIAMETER protocol.

FIG. 3 shows a flowchart illustrating a charging control processing executed in a communication network control element of a (visited) network providing access to a specified communication area according to examples of embodiments of the invention.

In step S100, the network detects that a UE tries to get access to the communication network in the specified communication area (hotspot or the like) which is to be charged differently.

In step S110, the network determines a charging setting to be used for a communication in the specified communication network area, for example that a charging amount is to be multiplied with a factor or that a specific charging model is to be used. In other words, it is determined whether for the communication area in which the UE tries to gain access different charging is to be used in comparison to at least one other communication network area having another location, or in comparison to another time frame when the communication is to be conducted (e.g. outside a peak time), or in comparison to a communication conducted under different communication conditions (e.g. other bandwidth requirement or the like).

In step S120, it is determined in the visited network whether a negotiation with the home network of the access requesting UE is required or not. For example, it is checked whether a pre-agreement with the home network operator regarding the charging setting for a specified communication area exists or not.

If a negotiation is required, then step S130 is conducted where a negotiation processing as described above is executed between the visited network and the home network. The (finally) agreed charging setting is then used for the further processing which may be different to that determined in step S110. Then, the process proceeds to step S140.

Otherwise, if no negotiation is required, then step S140 follows directly after step S120.

It is to be noted that according to examples of embodiments of the invention the steps S120 and S130 may be omitted, i.e. the possibility to conduct a negotiation between the visited network and the home network is optional.

In step S140, a rating attribute corresponding to the (selected) charging setting is prepared and included in a connection data element, such as a CDR, which is then sent in step S150 to a rating/charging engine on a service layer for charging the UE for a communication in the specified communication area according to the charging setting. The rating attribute may indicate a multiplication factor, an index to a rating model, or the like.

FIGS. 4a and 4b show flowcharts illustrating a charging control processing executed in a network element of a home network, e.g. in a rating/charging engine according to examples of embodiments of the invention.

According to FIG. 4a, in step S200, a connection data element like a CDR is received, which comprises a rating attribute indicating a charging setting to be used for charging a communication of a UE or the like in a specified communication network area of a visited network. That is, the CDR comprises an information element indicating that for the communication area in which a UE tries to gain access a different charging is to be used in comparison to at least one other communication network area having another location, or in comparison to another time frame when the communication is to be conducted (e.g. outside a peak time), or in comparison to a communication conducted under different communication conditions (e.g. other bandwidth requirement or the like)

In step S210, the rating attribute received in step S200 is processed so as to determine the charging setting, i.e. to derive for example a multiplication factor or an index to a predetermined charging model, wherein in the latter case the rules for charging according to the charging model are determined. It is to be noted that step S210 may also comprise a verification processing so as to verify that the charging setting for a communication in the specified communication area of the visited network is agreed (otherwise, the processing in FIG. 4b described below may be initiated or the authorization may be denied).

In step S220, the charging setting derived from the rating attribute is enforced, i.e. charging for the communication of the UE in the specified communication network area is conduced with a charging amount which is based on the charging setting.

According to FIG. 4b, a negotiation processing between the visited network and the home network for finding an agreement regarding a charging setting for the specified communication area is described.

In step S230, it is determined whether a negotiation is required or not. For example, it is checked whether an initial message in the AAA process comprises an indication for a proposed charging setting (in the form of a corresponding rating attribute, for example), or if it is determined that a corresponding pre-agreement does not exist between the visited network operator and the home network operator.

If the determination in step S230 is negative, the processing according to FIG. 4a starting at step S200 may be executed directly.

Otherwise, in case the determination in step S230 is positive, i.e. it is required to conduct a negotiation, a corresponding negotiation processing as described above may be executed between the visited network and the home network so as to find an agreement regarding a usable charging setting.

Figure 5:
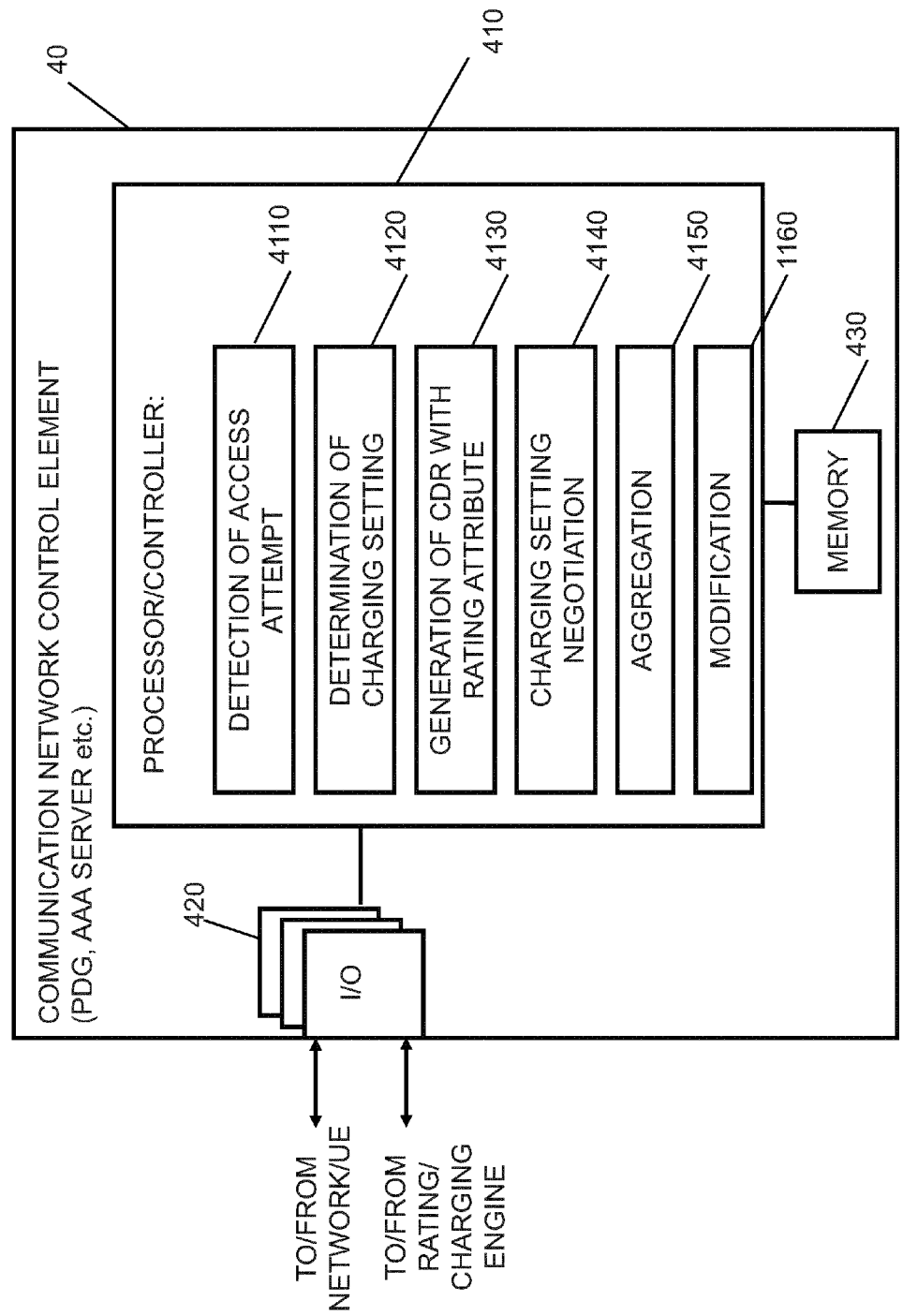
FIG. 5 shows a block circuit diagram of a communication network control element of a specified communication area including processing portions conducting functions according to examples of embodiments of the invention.

FIG. 5 shows a block circuit diagram of a communication network control element, such as an AAA server, an AAA proxy or an accounting aggregation server including processing portions conducting functions according to examples of embodiments of the invention. Specifically, in FIG. 5, a block circuit diagram illustrating a configuration of communication network control element like an AAA server is shown, which is configured to implement functions for a processing as described in connection with the examples of embodiments of the invention according to FIG. 3.

It is to be noted that the communication network control element like an AAA server shown in FIG. 5 may comprise several further elements or functions besides those described herein below, which are omitted herein for the sake of simplicity as they are not essential for understanding the invention. Furthermore, even though reference is made to a network node or the like, the communication network control element may be also another device having a similar function, such as a chipset, a chip, a module etc., which can also be part of a communication network control element or attached as a separate element to a communication network control element, or the like. Moreover, it is to be noted that a network element according to examples of embodiments of the invention does not need to comprise all of the processing portions described below, as long as the main functionality regarding the charging control as described above can be executed.

The communication network control element (AAA server) 40 may comprise a processing function or processor 410, such as a CPU or the like, which executes instructions given by programs or the like related the transmission control. The processor 410 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 420 denotes interface or transceiver or input/output (I/O) units connected to the processor 410. The I/O units 420 may be used for communicating with elements of a communication network, such as a home network of a UE, as well as with the network, i.e. a connection chain ending at the UE. The I/O units 420 may be a combined unit comprising communication equipment towards several network elements, or may comprise a distributed structure with a plurality of different interfaces for different network elements. Reference sign 430 denotes a memory usable, for example, for storing data and programs to be executed by the processor 410 and/or as a working storage of the processor 410.

The processor 410 is configured to execute processing related to the above described transmission control mechanism. In particular, the processor 410 comprises a sub-portion 4110 as a processing portion which is usable as a detector for an access request or access attempt by a UE in a specified communication area. Furthermore, the processor 410 comprises a sub-portion 4120 as a processing portion which is usable for determining a charging setting for the specified communication area in question (e.g. a fixed charging setting like a multiplier, or an indication for a rating model, or the like). Furthermore, the processor 410 may comprise a sub-portion 4130 as a processing portion which is usable for generating the CDR (as an example for the connection data element) by including a rating attribute corresponding to the determined charging setting. Moreover, the processor 410 may comprise a sub-portion 4140 as a processing portion which is usable for conducting a negotiation processing with a home network of the requesting UE for finding an agreeable charging setting (which in turn may be used in portion 4130). In addition, the processor 410 may comprise a sub-portion 4150 as a processing portion which is usable as an aggregator for collecting account records from different locations. Furthermore, the processor 410 may comprise a sub-portion 4160 as a processing portion which is usable for modifying the rating attribute (i.e. the charging setting) on the basis of information provided by the aggregator portion (this function is provided e.g. in a proxy in the accounting chain).

Figure 6:
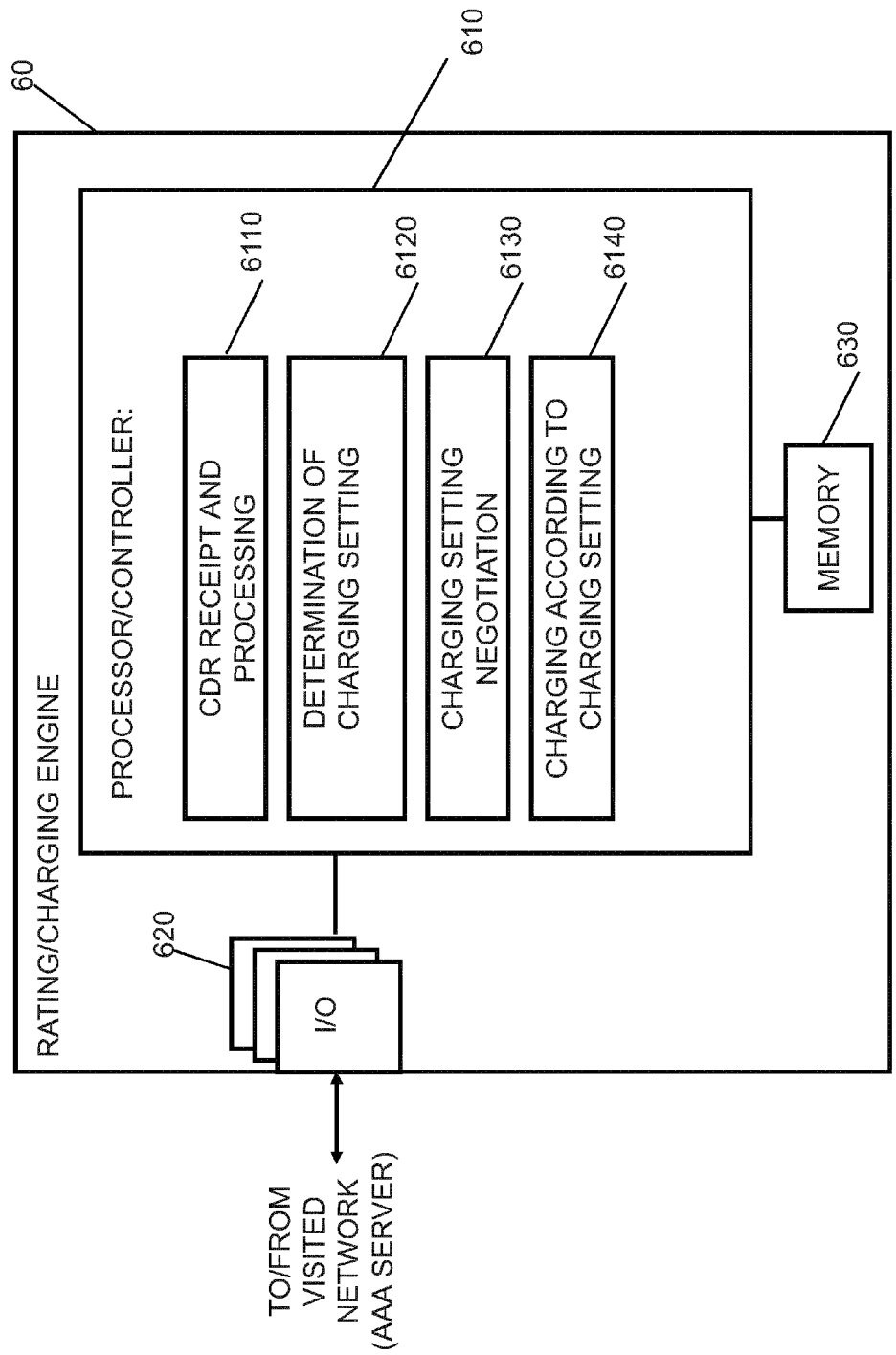
FIG. 6 shows a block circuit diagram of a communication network control element used in a rating/charging engine including processing portions conducting functions according to examples of embodiments of the invention.

FIG. 6 shows a block circuit diagram of a network element being a control element of a rating/charging engine including processing portions conducting functions according to examples of embodiments of the invention. Specifically, in FIG. 6, a block circuit diagram illustrating a configuration of network element of a rating/charging engine located in a AAA server element in a home network of a UE is shown, which is configured to implement functions for a processing as described in connection with the examples of embodiments of the invention according to FIG. 4.

It is to be noted that the network element 60 shown in FIG. 6 may comprise several further elements or functions besides those described herein below, which are omitted herein for the sake of simplicity as they are not essential for understanding the invention. Furthermore, even though reference is made to a AAA server or the like, the network element 60 may be also another device having a similar function, such as a chipset, a chip, a module etc., which can also be part of a communication network control element or attached as a separate element to a communication network control element, or the like. Moreover, it is to be noted that a network element according to examples of embodiments of the invention does not need to comprise all of the processing portions described below, as long as the main functionality regarding the charging control as described above can be executed.

The network element 60 may comprise a processing function or processor 610, such as a CPU or the like, which executes instructions given by programs or the like related the transmission control. The processor 610 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 620 denotes interface or transceiver or input/output (I/O) units connected to the processor 610. The I/O units 620 may be used for communicating with elements of a visited network, such as a communication network control element like an AAA server or the like. The I/O units 620 may be a combined unit comprising communication equipment towards several network elements, or may comprise a distributed structure with a plurality of different interfaces for different network elements. Reference sign 630 denotes a memory usable, for example, for storing data and programs to be executed by the processor 610 and/or as a working storage of the processor 610.

The processor 610 is configured to execute processing related to the above described transmission control mechanism. In particular, the processor 610 comprises a sub-portion 6110 as a processing portion which is usable for receiving and processing a connection data element like a CDR comprising a rating attribute for indicating a charging setting for a specified communication area. Furthermore, the processor 610 comprises a sub-portion 6120 as a processing portion which is usable for determining the charging setting to be used for charging a UE or the like communicating in the specified communication area, wherein the sub-portion 6120 may also decide whether a proposed charging setting (sent from the visited network e.g. in an access message) is acceptable or not, i.e. whether a negotiation process is required. Furthermore, the processor 610 may comprise a sub-portion 6130 as a processing portion which is usable for conducting the negotiation process with the visited network. Moreover, the processor 610 may comprise a sub-portion 6140 as a processing portion which is usable for actually conducting the charging process on the basis of the charging setting received/accepted (i.e. derived from the rating attribute).

According to a further example of an embodiment of the invention, there is provided an apparatus comprising detecting means for detecting an access attempt of a communication network element in a specified communication network area, determining for determining a charging setting to be used for a communication in the specified communication network area, and rating information processing means for introducing a rating attribute information element in a connection data element for indicating the charging setting to be used for charging a communication of the communication network element in the specified communication network area.

According to a still further example of an embodiment of the invention, there is provided an apparatus comprising connection data element processing means for receiving and processing a connection data element comprising a rating attribute information element for indicating a charging setting to be used for charging a communication of a communication network element in a specified communication network area, and rating and charging processing means for charging for the communication of the communication network element in the specified communication network area an amount based on the charging setting received in the connection data element.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a charging control mechanism allowing flexible charging in specified communication areas of a communication network, for example of a WLAN. When it is detected that a UE tries to access in a specified communication network area, a charging setting to be used for a communication in the specified communication network area is determined and a rating information in the form of a rating attribute is included in each CDR for indicating the charging setting to be used for charging a communication of the UE in the specified communication network area. A rating/charging engine uses the rating attribute for determining the charging amount for the communication.

Although the present invention has been described herein before with reference to particular embodiments thereof, the present invention is not limited thereto and various modifications can be made thereto.

The invention claimed is:
1. An apparatus comprising:
at least one processor; and
at least one memory including computer program code, where the at least one memory and the computer program code are configured, with the at least one processor, to cause the apparatus to at least:
receive a rating attribute information element from a specified communication network area for indicating a charging setting to be used for charging a communication of a communication network element in the specified communication network area;
add the rating attribute information element to a connection data element to indicate one of a multiplier and an index value particular to the specified communication network area to use to change a default charging amount for the communication of the communication network element, wherein the rating attribute information element comprises a value associated with the one of the multiplier and the index value for the specified communication network area, and wherein the charging setting changes the default charging amount with the value to determine a final charge for the communication; and
charge for the communication of the communication network element in the specified communication network area the final chare based on the changed default charging amount.

2. The apparatus according to claim 1, wherein the charging setting to be used for a communication in the specified communication network area changes the default charging amount with the value to reflect a difference in charging in comparison to at least one of a communication network area having another location, to a communication conducted at another time or under different communication conditions.

3. The apparatus according to claim 1, wherein the at least one memory including the computer code is configured with the at least one processor to cause the apparatus to select a predefined rating model related to the index value and to use the rating model for determining the final charge amount.

4. The apparatus according to claim 1, wherein the connection data element processing portion is configured to receive a call data record as the connection data element, the call data record being directed to a rating and charging function element in a service layer.

5. The apparatus according to claim 1, wherein the at least one memory including the computer code is configured with the at least one processor to cause the apparatus to receive and process a proposal for a charging setting to be used for a communication of a specific communication network element in the specified communication network area, wherein
the apparatus is caused, in case the proposal for a charging setting is accepted, to send an acceptance for the proposed charging setting, and
the apparatus is caused, in case the proposal for a charging setting is not accepted, to generate and transmit an alternative proposal for a charging setting being different to the proposed charging setting.

6. The apparatus according to claim 5, wherein the at least one memory including the computer code is configured with the at least one processor to cause the apparatus to receive the proposal for a charging setting in an initial access request message for an authentication, authorization and accounting session.

7. The apparatus according to claim 1, wherein the apparatus is comprised in an authentication-authorization-accounting server element of a communication network.

8. The apparatus according to claim 1, wherein the apparatus is comprised in a communication network control element of a communication network being a home network of the access attempting communication network element, wherein the at least one memory including the computer code is configured with the at least one processor to cause the apparatus to receive the connection data element from a visited network.

9. A method comprising
receiving a rating attribute information element from a specified communication network area for indicating a charging setting to be used for charging a communication of a communication network element in the specified communication network area;
add the rating attribute information element to a connection data element to indicate one of a multiplier and an index value particular to the specified communication network area to use to change a default charging amount for the communication of the communication network element, wherein the rating attribute information element comprises a value associated with the one of the multiplier and the index value for the specified communication network area, and wherein the charging setting changes the default charging amount with the value to determine a final charge for the communication; and
conducting charging for the communication of the communication network element in the specified communication network area the final charge based on the changed default charging amount.

10. The method according to claim 9, wherein the charging setting to be used for a communication in the specified communication network area changes the default charging amount with the value to reflect a difference in charging in comparison to at least one of a communication network area having another location, to a communication conducted at another time or under different communication conditions.

11. The method according to claim 9, the method further comprising selecting a predefined rating model related to the index value and using the rating model for determining the final charge amount.

12. The method according to claim 9, further comprising receiving a call data record as the connection data element, the call data record being directed to a rating and charging function element in a service layer.

13. The method according to claim 9, further comprising
receiving and processing a proposal for a charging setting to be used for a communication of a specific communication network element in the specified communication network area, and
in case the proposal for a charging setting is accepted, sending an acceptance for the proposed charging setting, and
in case the proposal for a charging setting is not accepted, generating and transmitting an alternative proposal for a charging setting being different to the proposed charging setting.

14. The method according to claim 13, further comprising receiving the proposal for a charging setting in an initial access request message for an authentication, authorization and accounting session.

15. The method according to claim 9, wherein the method is implemented in an authentication-authorization-accounting server element of a communication network.

16. The method according to claim 9, wherein the method is implemented in a communication network control element of a communication network being a home network of the access attempting communication network element, wherein the connection data element is received from a visited network.

17. A computer program product for a computer, comprising software code portions stored on a non-transitory computer-readable medium, the software code executed by a processor and run on the computer to perform the method of claim 9.

18. The computer program product according to claim 17, wherein
the software code portions are transmittable to the computer program product via a network by at least one of upload, download and push procedures.

* * * * *

UNITED STATES PATENT AND TRADEMARK OFFICE
CERTIFICATE OF CORRECTION

PATENT NO.         : 9,820,129 B2
APPLICATION NO.    : 14/367283
DATED              : November 14, 2017
INVENTOR(S)        : Alessandra Pandolfi and Maximilian Riegel It is certified that error appears in the above-identified patent and that said Letters Patent is hereby corrected as shown below:

In the Claims

In Claim 1:
Column 16, Line 24, "chare" should be deleted and --charge-- should be inserted Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*